UNITED STATES PATENT OFFICE.

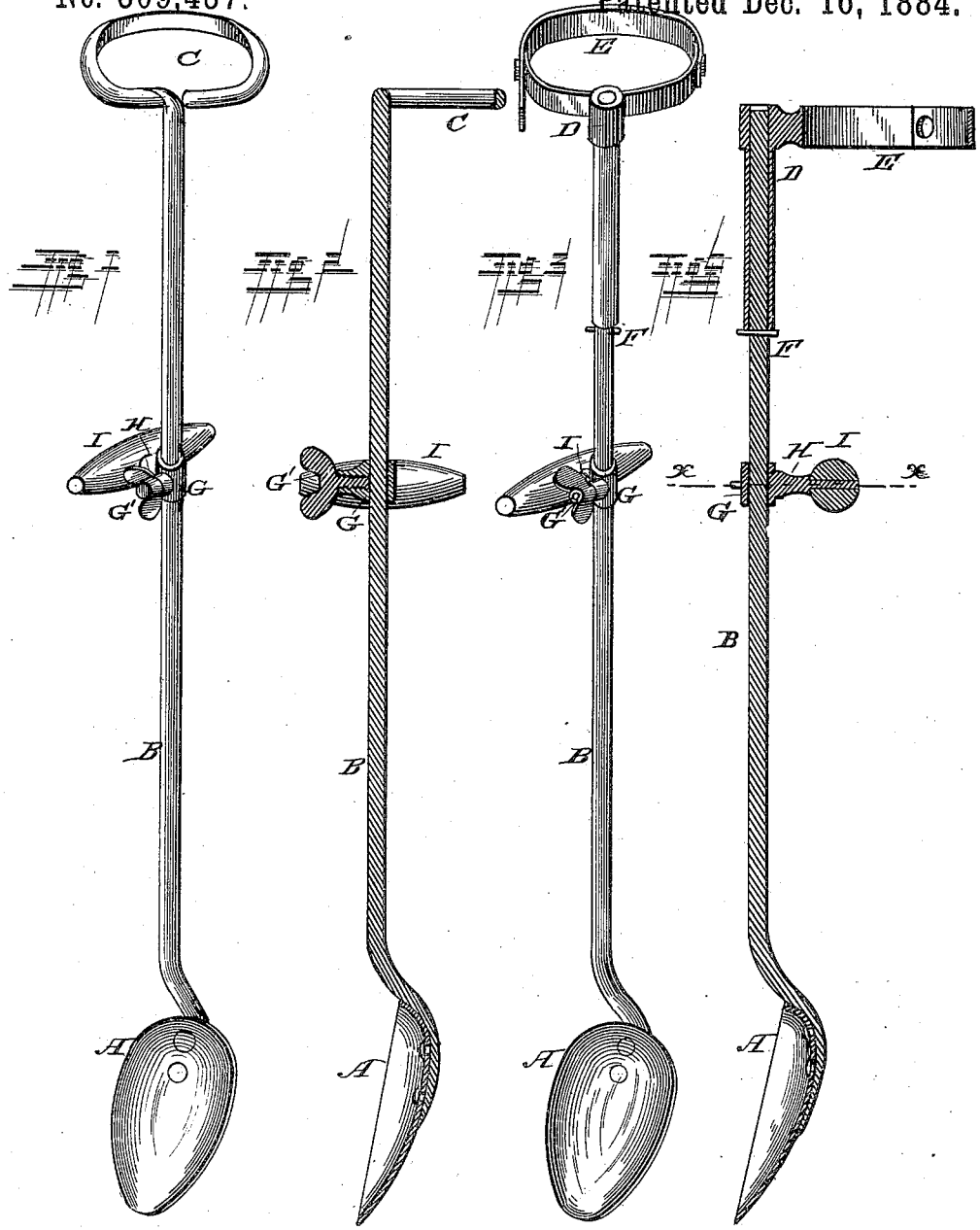

JOSEPH WARREN CALEF, OF NORTH EASTON, MASSACHUSETTS.

SPOON.

SPECIFICATION forming part of Letters Patent No. 309,437, dated December 16, 1884.

Application filed August 14, 1884. (No model.)

*To all whom it may concern:*

Be it known that I, JOSEPH W. CALEF, a citizen of the United States, and a resident of North Easton, in the county of Bristol and State of Massachusetts, have invented certain new and useful Improvements in Spoons; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved spoon, showing the arm-piece made in one piece with the handle of the same. Fig. 2 is a vertical longitudinal sectional view of the same. Fig. 3 is a perspective view illustrating a modification. Fig. 4 is a longitudinal vertical sectional view of the same, and Fig. 5 is a transverse sectional view taken on the line $x$ $x$ in Fig. 4.

The same letters refer to the same parts in all the figures.

This invention relates to spoons for mixing flour, dough, pastry, and the like; and it has for its object to provide a device of this kind which shall be simple in construction, inexpensive, convenient, and easily manipulated.

To this end it consists in the improved construction and arrangement of parts, which will be hereinafter fully described, and particularly pointed out in the claims.

In the drawings hereto annexed, A designates the bowl of the spoon, which is of ordinary size and shape, and provided with a straight shank or handle, B, which may be cylindrical in cross-section. The upper end of the shank B may, as in Figs. 1 and 2, be bent so as to form an arm-piece or spring, C, or it may, as in Figs. 3 and 4, be provided with a swiveled and detachable arm-piece, D, having a strap, spring, or other device, E, by means of which it may be readily secured or attached upon the arm of the operator. When this swiveled and detachable arm-piece is used, it is retained in position upon the upper end of the handle of the spoon by means of a transverse pin or cross-piece, F, in the latter.

G is a sleeve adjustable upon the spoon-handle B by means of a set-screw, G', working transversely in the said sleeve G. The latter is provided with a shank, H, having a handle, I, which may be conveniently grasped by the hand of the operator.

From the foregoing description, taken in connection with the drawings hereto annexed, the operation and advantages of this invention will be readily understood. The operator, having passed his hand through the arm-piece, grasps the handle, which may be readily adjusted to fit conveniently into the hand, when the spoon may be used for stirring or mixing materials with great power and efficiency.

The construction of the device is simple, and it may be produced at a cost which does not necessarily exceed that of mixing-spoons of ordinary construction.

I would have it understood that I do not limit myself to the construction or constructions of the device which have been herein shown and described, inasmuch as various modifications might be resorted to without departing from the spirit of my invention; therefore,

Having thus described my invention, I claim and desire to secure by Letters Patent of the United States—

1. A mixing-spoon having a shank formed at its upper end with an elastic arm-piece, substantially as and for the purpose set forth.

2. A spoon comprising a bowl and a shank or handle provided at its upper end with a swiveled arm-piece, substantially as and for the purpose set forth.

3. The combination, with a spoon having a straight shank or handle provided with an arm-piece, substantially as described, of a sleeve adjustable upon the said shank, and having a suitable hand-piece, substantially as and for the purpose set forth.

4. As an improvement in spoons, the combination, with a bowl having a straight handle provided with a suitable arm-piece, of a hand-piece adjustable upon the said handle, substantially as and for the purpose set forth.

5. The herein-described improved mixing-spoon, comprising a bowl having a straight handle or shank, a swiveled elastic arm-piece, and an adjustable hand-piece, substantially as and for the purpose herein set forth.

In testimony that I claim the foregoing as my own I have hereunto affixed my signature in presence of two witnesses.

JOSEPH WARREN CALEF.

Witnesses:
LEBBEUS H. BROCKWAY,
TYLER B. KING.